United States Patent [19]

Dammann et al.

[11] Patent Number: 4,746,182

[45] Date of Patent: May 24, 1988

[54] PHASE-MATCHED MAGNETOOPTICAL MODE CONVERTER

[75] Inventors: Hans O. B. Dammann, Tangstedt; Elke B. Pross, Hamburg; Gert Rabe, Pinneberg; Wolfgang F. M. Tolksdorf, Tornesch; Manfred B. Zinke, Hamburg, all of Fed. Rep. of Germany

[73] Assignee: U.S. Philips Corp., New York, N.Y.

[21] Appl. No.: 872,363

[22] Filed: Jun. 9, 1986

[30] Foreign Application Priority Data

Jun. 12, 1985 [DE] Fed. Rep. of Germany ....... 3520991

[51] Int. Cl.[4] ............................ G02B 6/10; G02F 1/01
[52] U.S. Cl. ............................ 350/96.13; 350/96.14; 350/353
[58] Field of Search ............... 350/96.10, 96.12, 96.13, 350/96.14, 353, 355

[56] References Cited

U.S. PATENT DOCUMENTS

| 4,032,216 | 6/1977 | Henry | 350/96.13 |
| 4,037,263 | 7/1977 | Moeckel | 350/96.13 |
| 4,136,350 | 1/1979 | Tien | 350/96.14 X |
| 4,220,395 | 9/1980 | Wang et al. | 350/96.12 |
| 4,246,549 | 1/1981 | Carter et al. | 350/355 X |
| 4,387,953 | 1/1983 | Shirasaki et al. | 350/96.13 |

FOREIGN PATENT DOCUMENTS 1529374 10/1978 United Kingdom .

OTHER PUBLICATIONS

Dammann, H. et al., "Design and Analysis of a Waveguide Isolator with a Form-Birefringement Top Layer", *Proc. 10th European Conference on Optical Communication*, 1984, pp. 42–43.

Ando, K. et al., "Growth Induced Optical Birefringence in LPE-Grown Bi-Biased Iron Garnet Films", *Japanese Journal of Applied Physics*, vol. 22, No. 10, pp. L618–L620 (Oct. 10, 1983).

*Primary Examiner*—William L. Sikes
*Assistant Examiner*—Akm E. Ullah
*Attorney, Agent, or Firm*—Thomas A. Briody; Jack E. Haken

[57] ABSTRACT

The invention relates to a magnetooptical waveguide device for the conversion of modes of propagation of the device. The device comprises layers (1, 4, 5, 6, 7) which are epitaxially applied to a substrate layer (8) and of which at least the waveguide layer (1) in which the modes propagate consists of a transparent magnetooptical material for which mode conversion can be induced by a magnetic field. For more accurate matching of the phase velocity of the TE and TM modes this structure is disposed in an apparatus (14, 15) by which an adjustable mechanical deformation force (24, 25) is exerted on the wave guide structure.

16 Claims, 1 Drawing Sheet

PHASE-MATCHED MAGNETOOPTICAL MODE CONVERTER

BACKGROUND OF THE INVENTION

The invention relates to a magnetooptical waveguide device for the conversion of modes of propagation of the device. The device comprises layers which are epitaxially applied to a substrate layer and of which at least the waveguide layer in which the modes propagate consists of a transparent magnetooptical material that can be acted upon by a magnetic field for the mode conversion. Further means for matching the phase velocities of the TE and of the TM modes are provided.

Such planar monomode waveguide structures required, for example, for optical isolators or circulators are known from GB PS No. 1,529,374.

In the waveguide layer, transverse electrical (TE) and transverse magnetic (TM) modes are converted into each other in a nonreciprocal manner (mode conversion). This is attained, for example, by the Faraday effect, which leads to TE/TM mode coupling in the waveguide layer magnetized in the direction of propagation. However, with this coupling the desired complete mode conversion is obtained only if both participating modes, i.e. the TE and TM modes, have the same speed of propagation (phase velocity) because only then a continuous and cumulative transmission of the energy from one mode to the other is possible.

For the difference $\Delta\beta$ of the propagation constants $\beta_{TM}$ and $\beta_{TE}$ of the TE and TM modes, respectively, the value zero is therefore aimed at for phase matching.

For many applications in the optical communication technology, an extremely high efficiency of the nonreciprocal mode conversion in magnetooptical waveguides is desired, for example for isolators $n \geq 99.999\%$. This means especially for the practically important case of weakly propagating modes an extremely accurate phase matching. The extraordinarily exact adjustment of the refractive indices effective for both modes required to this end is not attainable with tolerable requirements with respect to the manufacturing accuracy.

In GB PS No. 1,529,374, it suggested to provide phase matching by means of additional layers on the waveguide layer. The required geometrically accurate disposition of these layers can be obtained only with difficulty.

From the Jap. J. Appl. Phys. 22 (1983), pages L618 to L620, it is known that the anisotropy obtained during the growth of the layers can be influenced in such a manner that the difference $\Delta\beta$ becomes zero. For practical use, however, an extraordinarily high manufacturing accuracy would be required.

According to "Proc. 10$^{th}$ European Conference on Optical Communication 1984, page 42", a phase matching can also be obtained by a coating layer applied to the waveguide layer and having the form of a birefringent grating structure. This certainly also requires an undesirably high manufacturing accuracy.

Moreover, the known phase matching means have the great disadvantage that it is not possible to carry out corrections after the layers have been applied.

U.S. Pat. No. 4,220,395 describes mode coupling not in the waveguide layer, but at its interfaces with adjacent layers. Phase matching is obtained by means of a standing acoustic wave, whose acoustic frequency is adjusted so that $\Delta\beta = 0$ is obtained. The arrangements to be provided for producing a standing acoustic wave are complicated and are not suitable to be successful in waveguide structures of the kind mentioned in the opening paragraph.

SUMMARY OF THE INVENTION

It is an object of the invention to construct a device of the kind described above in such a manner that the phase matching of the TE and TM modes can be attained with higher accuracy.

The device is characterized in that, for matching the phase velocities, the waveguide structure is arranged in means for exerting an adjustable mechanical deformation force on the waveguide structure.

Waveguide devices according to the invention on the basis of pure or, for exmaple, lead substituted yttrium iron garnet layers applied epitaxially from the liquid phase to a GGG (gadolinium gallium garnet) substitute layer, have, depending upon the manner of manufacturing and the quantity of the dopants, different values of $\Delta\beta$, which may be negative or positive and are generally not zero.

Three components of $\Delta\beta$ of different physical origin are to be taken into account:

$$\Delta\beta = (\Delta N_{\mathit{eff}} + \Delta ng + \Delta ns) \cdot 2\pi/\lambda$$

($\lambda$ = vacuum wavelength).

Even with the use of isotropic materials, the component $\Delta N_{\mathit{eff}}$, which is determined by the form, is in the order of about $-10^{-5}$ and leads to different speeds of propagation of the TM and TE modes.

A birefringence $\Delta ng$ of about $+4 \times 10^{-4}$ determined by the growth arises from a deviation of the crystal lattice structure from the cubic form because in the process of growing films small dislocations of the lattice elements can be obtained. By annealing, the birefringence determined by the growth can be reduced.

The tension induced birefringence $\Delta ns$ can assume, depending upon the quantity of, for example, the lead content, values between about $-4 \cdot 10^{-4}$ and $+4 \cdot 10^{-4}$ and arises from misfit of the crystal lattice constants of the substrate layer and of the film layers applied. At any rate, the values $\Delta ns$ can be preadjusted with an accuracy of about $5 \cdot 10^{-5}$.

During the manufacture of a device according to the invention, an extraordinary accuracy may be dispensed with. It has been found that in a surprisingly simple manner the remaining values $\Delta\beta \neq 0$ can be eliminated by externally applying a static stress. For positive values of $\Delta\beta$ a pressure force has to be applied and for negative values thereof a negative tensile force has to be applied. The stress can be applied afterwards and adapted to each specimen of a wave guide structure in a simple manner so that always the residual value $\Delta\beta$ can be rendered zero. At a pressure of 1 kN/cm$^2$, a compensation value of about $5 \cdot 10^{-5}$ was obtained.

With a device according to the invention, conformities of the phase velocities of the TE and TM modes can be obtained in a simple manner, as could not be attained hitherto with this accuracy.

The mechanical stress can be produced advantageously by a bending moment acting upon the waveguide structure, the bending stresses occurring outside the neutral stressless axis being utilized and also causing a deformation of the waveguide structure. Depending upon the direction of the bending moment, the material of the waveguide structure can be compressed or expanded in a direction at right angles to the plane of the layer. For producing particular effects, an anisotropic variation of deformation of the plane of the waveguide can be adjusted in that the bending moment is applied in a plane which is intersected by the direction of light propagation at an angle of more particularly 45°.

A pressure force can be intentionally applied to the light-conducting strips of the waveguide layer when a force produced by a piezoelectric element is applied through a pressure die to the waveguide layer.

Particularly advantageous results were obtained with the use of a waveguide structure in which further layers are epitaxially applied to the substrate layer in the following order of succession:
a lower absorption layer,
a lower cladding layer,
the waveguide layer,
an upper cladding layer and
an upper absorption layer.

Advantageously, the refractive indices of the lower and upper cladding layers are lower than that of the waveguide layer.

BRIEF DESCRIPTION OF THE DRAWING

In order that the invention may be readily carried out, it will now be described more fully, by way of example, with reference to the accompanying drawing, in which.

DESCRIPTION OF THE PREFERRED EMBODIMENTS

Figure 1:
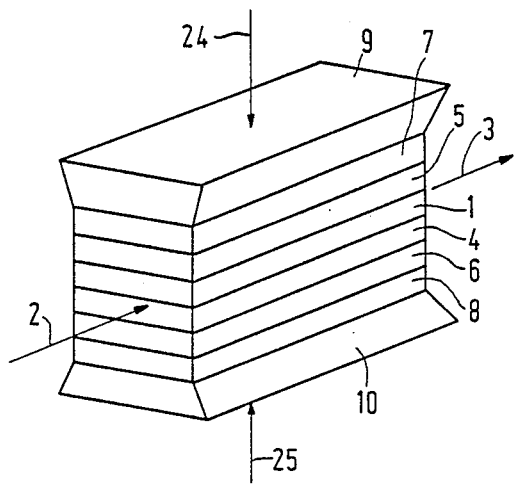
FIG. 1 shows the principal construction of a waveguide device according to the invention.

FIG. 1 shows a symmetrical magnetooptical waveguide structure. The core layer (1) of the waveguide consists of magnetooptical material, for example of pure or substituted yttrium iron garnet (YIG). Light propagates in the direction of the arrows 2 (entrance) and 3 (exit) in the form of a TE mode and/or a TM mode.

The lower and upper cladding layers (4 and 5, respectively) have a refractive index, which is lower by about $5 \times 10^{-3}$ than that of the core layer of the waveguide. These cladding layers preferably also consist of magnetooptical material. The lower and upper absorption layers 6 and 7, respectively, serve to suppress cladding modes, i.e. modes not propagating through the core layer. All layers are successively applied epitaxially to the substrate layer 8, more particularly to a GGG layer.

A (positive or negative) adjustable force 24 is exerted on the waveguide structure by the dies 9 and 10 of an equipment not shown in FIG. 1. This force produces a uniform compressive or tensile stress, which leads to the desired deformation of the waveguide. Thus, an additional adjustable birefringence is obtained in the waveguide structure, by which the phase matching can intentionally be attained. Typical thicknesses of the layers 1 to 8 are:
substrate layer 8 0.5 mm
absorption layers 6 and 7 3 $\mu$m
cladding layers 4 and 5 4 $\mu$m
core layer 1 6 $\mu$m.

The equipment for producing an adjustable pressure or tensile force is indicated in the Figures only by example and may be constructed in different known ways. In the normal case, it should be taken into account that the mechanical stress is uniformly distributed over the whole magnetooptical waveguide. For producing particular effects, however, it may be advantageous to cause the mechanical forces to act non-uniformly upon the layer surfaces.

Figure 2:
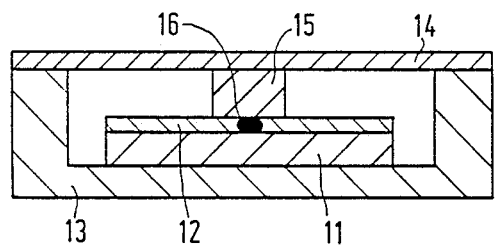
FIG. 2 shows diagrammatically an embodiment of the invention with a piezoelectric element as pressure generator.

In FIG. 2, the waveguide structure comprising the substrate layer 11 and the waveguide layer 12 is accommodated in a rigid housing 13. By means of the piezoelectric element 14, a mechanical compressive pressure force may be applied through the die 15 more particularly to the light-conducting strip 16 extending perpendicular to the plane of the paper. Since the stresses required for deformation are intentionally produced in the light-conducting region 16, the piezoelectric element 14 need produce only comparatively small forces.

Figure 3:
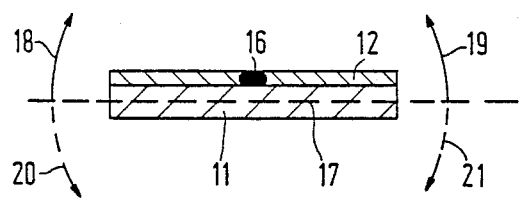
FIG. 3 illustrates the possibility of producing the desired deformation force by a bending moment.

By means of a bending moment, compressive or tensile stresses can be applied, as can be seen in FIG. 3. If bending forces act upon the waveguide structure in the direction of the arrows 18 and 19, a compressive stress parallel to the plane of the layer is produced in the light-conducting layer strip 16, reference numeral 17 indicating in broken lines the neutral axis without stress. The compressive stress leads to the expansion more particularly of the material of the strip 16 in a direction perpendicular to the plane of the waveguide layer 12 as if a tensile force were exerted in this perpendicular direction.

On the contrary, with forces acting in the directions 20 and 21, a tensile stress is produced in the strip 16 and this stress leads to a compression of the strip 16 in a direction perpendicular to the plane of the layer 12.

Figure 4:
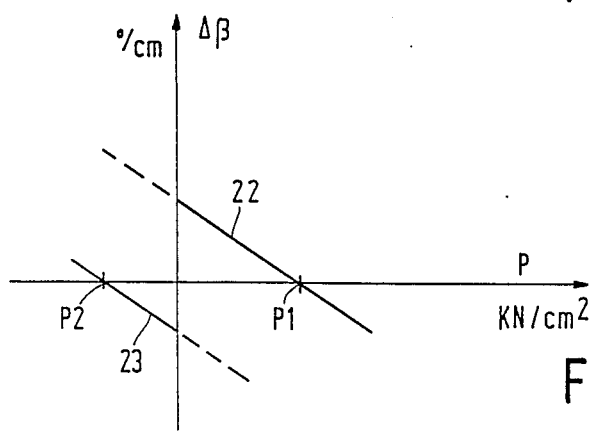
FIG. 4 shows measured characteristic curves of the resulting phase matching factor independence upon the applied compression stress.

FIG. 4 shows characteristic curves 22 and 23, which are obtained by means of measurements on two different samples doped with different lead quantities.

In a sample with originally positive $\Delta\beta$, according to the characteristic curve 22, an ideal phase compensation could be obtained by a pressure p1 of about 1.6 kN/cm$^2$ in the direction of the arrows 24 and 25 of FIG. 1. In another sample with originally negative $\Delta\beta$, for this purpose, according to the characteristic curve 23, a tensile stress p2 had to be applied.

What is claimed is:

1. A magnetooptical waveguide device for the conversion of modes of propagation of the device, which device comprises layes which are epitaxially applied to a substrate layer and of which at least the waveguide layer in which the modes propagate consists of a magnetooptical transparent material which for mode conversion can be acted upon by a magnetic field, whilst further means for matching the phase velocities of the TE and of the TM modes, are provided, characterized in that, for matching the phase velocities, the waveguide structure is arranged in an equipment by which an adjustable mechanical deformation force is exerted on the waveguide structure.

2. A device as claimed in claim 1, characterized in that the mechanical deformation force is produced by a bending moment applied to the waveguide structure.

3. A device as claimed in claim 2, characterized in that the bending moment is applied in a plane which is intersected by the direction of light propagation at an angle of more particularly 45°.

4. A device as claimed in any one of claims 1 to 3, characterized in that the mechanical deformation force is a pressure force which acts perpendicularly upon the layer planes.

5. A device as claimed in any one of claims 1 to 3, characterized in that the mechanical deformation force is a tensile force which acts perpendicularly on the plane of the layers.

6. A device as claimed in any one of claims 1 to 3, characterized in that a force produced by a piezoelectric element is transmitted through a pressure die to the wave guide layer.

7. A device as claimed in any one of claims 1 to 3, characterized in that it comprises in the following order of succession:
   a lower absorption layer,
   a lower cladding layer,
   the waveguide layer,
   an upper cladding layer and
   an upper absorption layer.

8. A device as claimed in claim 7, characterized in that the refractive indices of the upper and lower cladding layers are lower than that of the waveguide layer.

9. A magnetooptical waveguide device comprising:
   a substrate:
   a waveguide layer on the substrate, said waveguide layer comprising a magnetooptic material transparent to radiation to be propagated in the layer, said layer being capable of propagating a first mode of the radiation at a first phase velocity, said layer being capable of propagating a second mode of the radiation at a second phase velocity, said layer being capable of converting radiation of the first mode into radiation of the second mode when the layer is placed in a magnetic field; and
   adjustable means for mechanically deforming the waveguide layer so that the phase velocity of the first mode will be substantially equal to the phase velocity of the second mode.

10. A magnetooptical waveguide device as claimed in claim 9, characterized in that the mechanical deformation means produces a substantially static mechanical deformation in the waveguide layer.

11. A magnetooptical waveguide device as claimed in claim 10, characterized in that the mechanical deformation means applies a bending moment to the waveguide layer.

12. A magnetooptical waveguide device as claimed in claim 10, characterized in that the mechanical deformation means compresses the waveguide layer.

13. A magnetooptical waveguide device as claimed in claim 12, characterized in that the mechanical deformation means compresses the waveguide layer in a direction substantially perpendicular to the waveguide layer.

14. A magnetooptical waveguide device as claimed in claim 10, characterized in that the mechanical deformation means expands the waveguide layer.

15. A magnetooptical waveguide device as claimed in claim 14, characterized in that the mechanical deformation means expands the waveguide layer in a direction substantially perpendicular to the waveguide layer.

16. A magnetooptical waveguide device as claimed in claim 10, characterized in that the mechanical deformation means comprises a piezoelectric element.

* * * * *